(12) United States Patent
Li (10) Patent No.: US 11,559,874 B2
(45) Date of Patent: Jan. 24, 2023

(54) CLAMPING FORCE VISUALIZATION DEVICE AND CLAMP

(71) Applicants: HANGZHOU UNITED ELECTRIC MANUFACTURE CO., LTD., Zhejiang (CN); HANGZHOU GREAT STAR INDUSTRIAL CO., LTD., Zhejiang (CN)

(72) Inventor: Yueming Li, Zhejiang (CN)

(73) Assignees: HANGZHOU UNITED ELECTRIC MANUFACTURE CO., LTD., Hangzhou (CN); HANGZHOU GREAT STAR INDUSTRIAL CO., LTD., Hangzhou (CN)

( * ) Notice: Subject to any disclaimer, the term of this patent is extended or adjusted under 35 U.S.C. 154(b) by 0 days.

(21) Appl. No.: 17/295,460

(22) PCT Filed: Dec. 25, 2019

(86) PCT No.: PCT/CN2019/128334
§ 371 (c)(1),
(2) Date: May 20, 2021

(87) PCT Pub. No.: WO2020/143453
PCT Pub. Date: Jul. 16, 2020

(65) Prior Publication Data
US 2022/0001517 A1    Jan. 6, 2022

(30) Foreign Application Priority Data
Jan. 11, 2019   (CN) .......................... 201910026507.7

(51) Int. Cl.
*B25B 5/02* (2006.01)
*B25B 5/06* (2006.01)
*B25B 5/16* (2006.01)

(52) U.S. Cl.
CPC ................. *B25B 5/02* (2013.01); *B25B 5/06* (2013.01); *B25B 5/16* (2013.01)

(58) Field of Classification Search
CPC .... B25B 3/00; B25B 5/00; B25B 5/02; B25B 5/04; B25B 5/06; B25B 5/14; B25B 5/16
(Continued)

(56) References Cited

U.S. PATENT DOCUMENTS 9,759,617 B2 *   9/2017   Schmier, II ............. B25B 5/125
2013/0263674 A1* 10/2013  McKiernan ........... G01L 5/0057
                                                          73/856
2016/0299015 A1   10/2016  Schmier, II et al.

FOREIGN PATENT DOCUMENTS

CN     201613512 U  * 10/2010
CN     201613512 U    10/2010
(Continued)

OTHER PUBLICATIONS

CN-201613512-U—Machine Translation (Year: 2010).*
EPO's Supplementary Search Report for corresponding application EP19908877.4; Report dated Aug. 10, 2022.

*Primary Examiner* — Lee D Wilson
*Assistant Examiner* — Alberto Saenz
(74) *Attorney, Agent, or Firm* — Gang Yu (57) ABSTRACT

A clamping force visualization device, including a first clamping body (01) for clamping an object; the first clamping body (01) is telescopically assembled on a base (14), an elastic element (110) is provided between the first clamping body (01) and the base (14), and a clamping force scale (11) and a reading indicator (15) are respectively provided on the first clamping body (01) and the base (14); when the first clamping body (01) clamps the object, the elastic element (110) measures a clamping force and the reading indicator (15) points to the clamping force scale (11) for reading, so that the magnitude of the clamping force can be intuitively
(Continued)

seen and read during clamping, thereby achieving accurate clamping. A clamp including the clamping force visualization device is also involved.

20 Claims, 5 Drawing Sheets (58) Field of Classification Search
USPC .......... 269/3, 6, 43, 95, 156, 254 cs; 73/161, 73/856
See application file for complete search history.

(56) References Cited

FOREIGN PATENT DOCUMENTS

| | | |
|---|---|---|
| CN | 209615234 U | 11/2019 |
| DE | 202008000295 U1 | 3/2008 |
| DE | 102016015047 A1 | 6/2018 |
| FR | 2982516 A1 | 5/2013 |
| FR | 3047681 A1 | 8/2017 |
| JP | 2002205279 A | 7/2002 |
| JP | 2011179663 A | 9/2011 |

* cited by examiner

CLAMPING FORCE VISUALIZATION DEVICE AND CLAMP

CROSS-REFERENCE TO RELATED APPLICATION(S)

The present invention is a national stage application of International Patent Application No. PCT/CN2019/128334, which is filed on Dec. 25, 2019 and claims priority to Chinese Patent Priority No. 201910026507.7, filed to the National Intellectual Property Administration, PRC on Jan. 11, 2019, entitled "Clamping Force Visualization Device and Clamp", the disclosure of which is hereby incorporated by reference in its entirety.

TECHNICAL FIELD

The present disclosure belongs to a field of manual clamps, and in particular, relates to a manually-operated clamping force visualization device and a clamp.

BACKGROUND

In addition to the basic function of clamping, for the existing manual clamps, during use, the magnitude of the clamping force are often difficult to be determined, which results in the blindness of clamping and makes it difficult to accurately achieve the purpose of clamping.

SUMMARY

The technical problem to be solved and the technical task proposed in some embodiments of the present disclosure are to overcome the defect that it is difficult to determine the magnitude of a clamping force during use of an existing manual clamp; and a clamping force visualization clamp is provided, such that the magnitude of the clamping force is intuitively seen and read during clamping, thereby achieving accurate clamping.

In order to achieve the described object, a clamping force visualization device of some embodiments of the present disclosure includes a first clamping body for clamping an object, wherein the first clamping body is telescopically assembled on a base, an elastic element is provided between the first clamping body and the base, a clamping force scale and a reading indicator are respectively provided on the first clamping body and the base, and when the first clamping body clamps the object, the elastic element measures a clamping force, and the reading indicator points to the clamping force scale for reading.

As a preferred technical means of the clamping force visualization device, the base and the first clamping body are sleeved together, the base or the first clamping body located at an outer side is provided with the reading indicator or the clamping force scale, and the first clamping body or the base located at an inner side is provided with the visible clamping force scale or the reading indicator.

As a preferred technical means of the clamping force visualization device, the base is provided with an axial hole, the first clamping body is provided with a telescopic section, and the axial hole is sleeved on the telescopic section.

As a preferred technical means of the clamping force visualization device, the telescopic section is provided with an inner hole, and one end of the elastic element is supported at a bottom of the axial hole, and the other end of the elastic element is supported at a bottom of the inner hole.

As a preferred technical means of the clamping force visualization device, the base or the first clamping body is provided with a column, and the elastic element is a helical compression spring sleeved on the column.

As a preferred technical means of the clamping force visualization device, a window is provided on the base or the first clamping body at the outer side, and the reading indicator or the clamping force scale is provided at an edge of the window.

As a preferred technical means of the clamping force visualization device, a front end edge of the base or the first clamping body located at the outer side is used as the reading indicator, and the clamping force scale is provided on the first clamping body or the base located at the inner side.

As a preferred technical means of the clamping force visualization device, an adjustment screw is provided for the first clamping body, the adjustment screw passes through the first clamping body and is connected to the base, and the adjustment screw is screwed to adjust an initial pressure of the first clamping body on the elastic element.

In order to achieve the described object, a clamping force visualization clamp of some embodiments of the present disclosure includes the clamping force visualization device according to some embodiments of the present disclosure and a second clamping body (02) cooperating with the first clamping body to achieve clamping.

As a preferred technical means of the clamping force visualization clamp, the base is provided on a first arm, the second clamping body is provided on a second arm, the first arm is provided with a fixed handle in an integrated extending manner, the second arm is fixed on a guide rod, the guide rod is provided on the first arm in a penetrating manner, the first arm is provided with a force-applying handle, an unlocking handle, a force-applying clamping piece for applying a force to the guide rod, and a locking clamping piece for locking the guide rod on the first arm; the force-applying handle is linked with the force-applying clamping piece, such that when the force-applying handle and the fixed handle are gripped, the guide rod is caused to slide, and the second arm moves close to the first arm; and the unlocking handle is linked with the locking clamping piece, such that when the unlocking handle and the fixed handle are gripped, a locking of the locking clamping piece on the guide rod is released.

As a preferred technical means of the clamping force visualization clamp, the base is provided on a first arm, the second clamping body is provided on a second arm, the first arm is connected with a clamping handle and an unlocking handle, the second arm is fixed on a guide rod, and the guide rod is provided on the first arm in a penetrating manner.

As a preferred technical means of the clamping force visualization clamp, the base is provided on a first arm, the second clamping body is provided on a second arm, a first handle is extended from the first arm, a second handle is extended from the second arm, the first arm and the second arm are connected by a pivot, and a locking mechanism and an unlocking mechanism are provided between the first handle and the second handle.

As a preferred technical means of the clamping force visualization clamp, the base and the first arm are made integrally together.

As a preferred technical means of the clamping force visualization clamp, the base is assembled on the first arm.

As a preferred technical means of the clamping force visualization clamp, the base is mounted on the first arm in a snap-fit manner.

As a preferred technical means of the clamping force visualization clamp, the base is assembled on the first arm by a pin bolt.

In some embodiments of the present disclosure, a clamping body is telescopically assembled on a base, an elastic element is provided between the clamping body and the base, and a clamping force scale and a reading indicator are respectively provided on the clamping body and the base; and when an object is clamped, the elastic element measures a clamping force and the reading indicator points to the clamping force scale for reading, so that the magnitude of the clamping force can be intuitively seen and read during clamping, thereby realizing accurate clamping.

DESCRIPTION OF REFERENCE SIGNS IN THE DRAWINGS

01: first clamping body, 11: clamping force scale, 12: telescopic section, 13: inner hole, 14: base, 15: reading indicator, 16: window, 17: axial hole, 18: column, 19: clamping groove, 110: elastic element, 111: adjustment screw, 112: pad;

02: second clamping body;

03: first arm, 31: fixed handle, 32: force: applying handle, 33: unlocking handle, 34: force: applying clamping piece, 35: locking clamping piece, 36: clamping handle, 37: unlocking handle, 38: first handle;

04: second arm, 41: second handle;

05: guide rod;

06: pivot;

07: locking mechanism;

08: unlocking mechanism;

09: pin bolt.

DETAILED DESCRIPTION OF THE EMBODIMENTS

Hereinafter, some embodiments of the present disclosure are further described in combination with the drawings of the description.

Figure 4:
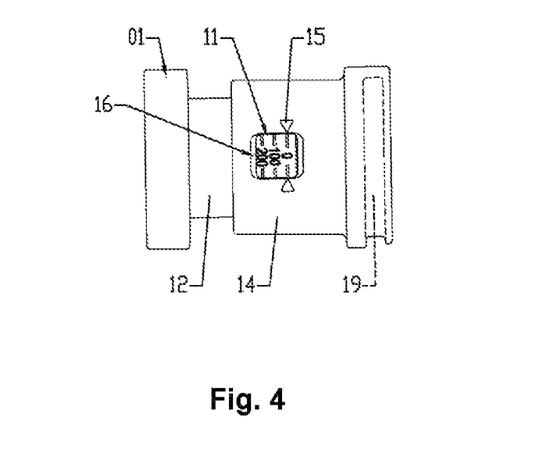
FIG. 4 is a schematic diagram showing an external structure in which a first clamping body is telescopically assembled on a base according to some embodiments of the present disclosure.
Figure 5:
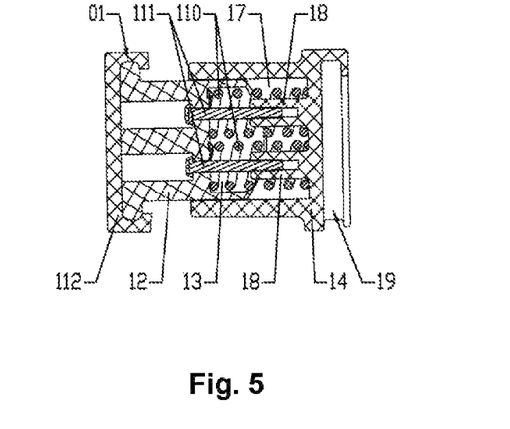
FIG. 5 is a schematic diagram showing an internal structure in which the first clamping body is telescopically assembled on the base according to some embodiments of the present disclosure.

A clamping force visualization device as shown in FIG. 4 and FIG. 5 includes a first clamping body 01 for clamping an object; the first clamping body 01 is telescopically assembled on a base 14, an elastic element 110 is provided between the first clamping body 01 and the base 14, a clamping force scale 11 is provided on the first clamping body 01, and a reading indicator 15 is provided on the base 14. When the first clamping body 01 clamps the object, the elastic element 110 measures a clamping force, and the reading indicator 15 points to the clamping force scale 11 for reading, such that the magnitude of the clamping force can be intuitively seen and read, thereby achieving accurate clamping. During clamping, as the magnitude of the clamping force changes, the position of the reading indicator and the clamping force scale will change relative to each other; therefore, as a specific implementation, the positions of the reading indicator and the clamping force scale can be exchanged.

In order to achieve a compact structure and accurate measurement, the base 14 and the first clamping body 01 are sleeved together. As shown in FIG. 4 and FIG. 5, a window 16 is provided on the base 14 located at an outer side, and reading indicator 15 is provided at an edge of the window; and the clamping force scale 11 visible through the window is provided on the first clamping body 01 located at an inner side. As a specific implementation, the cases may be that a window is provided on the first clamping body located at an outer side, and the reading indicator is provided at an edge of the window; and the clamping force scale visible through the window is provided on the base located at an inner side. Further, the positions of the reading indicator and the clamping force scale may be exchanged regardless of which one of the base and the first clamping body is at the outer side.

Figure 8:
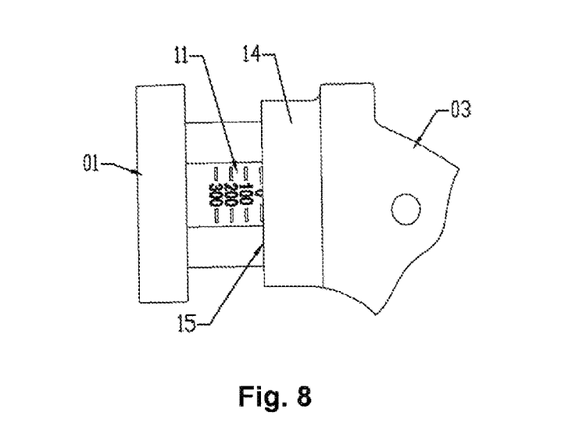
FIG. 8 is a schematic diagram in which a base and a first arm are made integrally together, and a front end edge of the base is used as a reading indicator according to some embodiments of the present disclosure.

In addition, as shown in FIG. 8, a front end edge of the base 14 located at the outer side is used as the reading indicator, and the clamping force scale is provided on the first clamping body located at the inner side. Obviously, the cases may be that the front end edge of the first clamping body located at the outer side is used as the reading indicator, and the clamping force scale is provided on the base located at the inner side.

In order to avoid the inaccuracy of measurement of the clamping force caused by shaking of the clamping body, the base 14 is provided with an axial hole 17, the first clamping body 01 is provided with a telescopic section 12, and the axial hole 17 is sleeved on the telescopic section 12. Further, the telescopic section 12 is provided with an inner hole 13, one end of the elastic element 110 is supported at a bottom of the axial hole 17, and the other end of the elastic element 110 is supported at a bottom of the inner hole 13. The base is provided with a column 18, and the elastic element 110 is a helical compression spring sleeved on the column 18, so that the helical compression spring is supported by the column while ensuring a compact structure, thereby avoiding inaccuracy of measurement caused by bending of the helical compression spring when the helical compression spring is pressed. In view of the supporting function of the column of the helical compression spring, the column may also be provided on the first clamping body.

In order to calibrate and adjust the initial pressure of the elastic element, an adjustment screw 111 is provided for the first clamping body, and the adjustment screw 111 passes through the first clamping body and is connected to the base 14, for maintaining the assembly relationship of the first clamping body, the base and the elastic element; and the initial pressure of the first clamping body on the elastic element can be adjusted by screwing the adjustment screw. Depending on use requirements, the initial pressure may be zero, or a certain pressure value. In view of this, the clamping force scale and the reading indicator may be marked (such as imprinting, laser marking, pad printing, etc.) at corresponding positions after the calibration and adjustment. As shown in the figures, the first clamping body includes a pad 112 at an end of the first clamping body, the pad shielding the adjustment screws. Likewise, a second clamping body includes a pad at an end of the second clamping body, and the pad can increase the contact with the clamped object while protecting the surface of the clamped object.

On the basis of the described clamping force visualization device, a clamp includes the clamping force visualization device and a second clamping body 02 cooperating with the first clamping body 01 to achieve clamping, i.e. being able to be used for clamping an object, and the clamp can take various forms.

Figure 1:
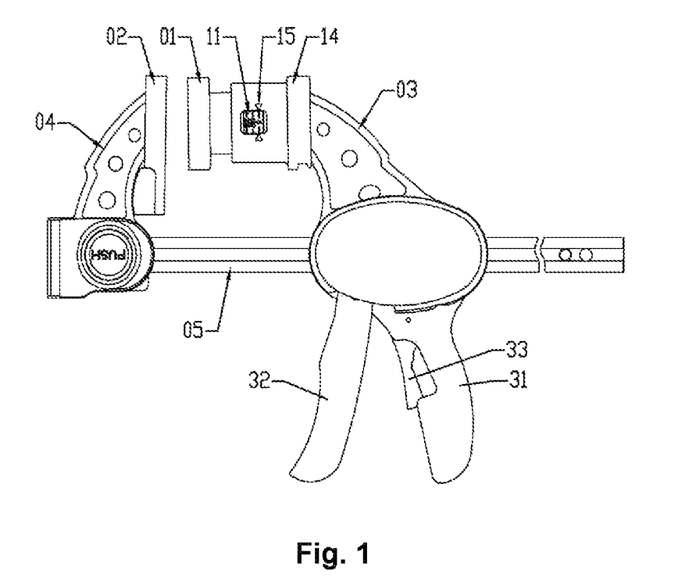
FIG. 1 is a schematic diagram of a first type of clamping force visualization clamp according to some embodiments of the present disclosure.
Figure 2:
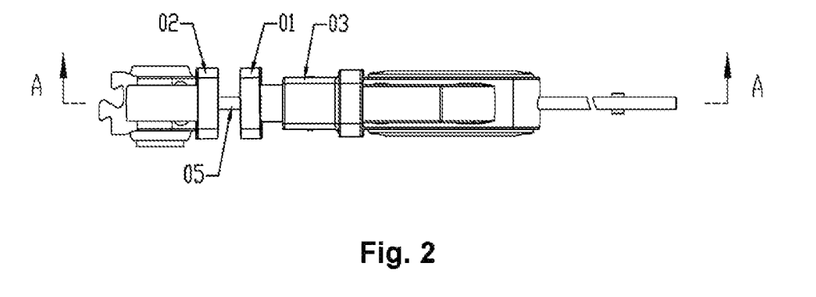
FIG. 2 is a top view of FIG. 1.
Figure 3:
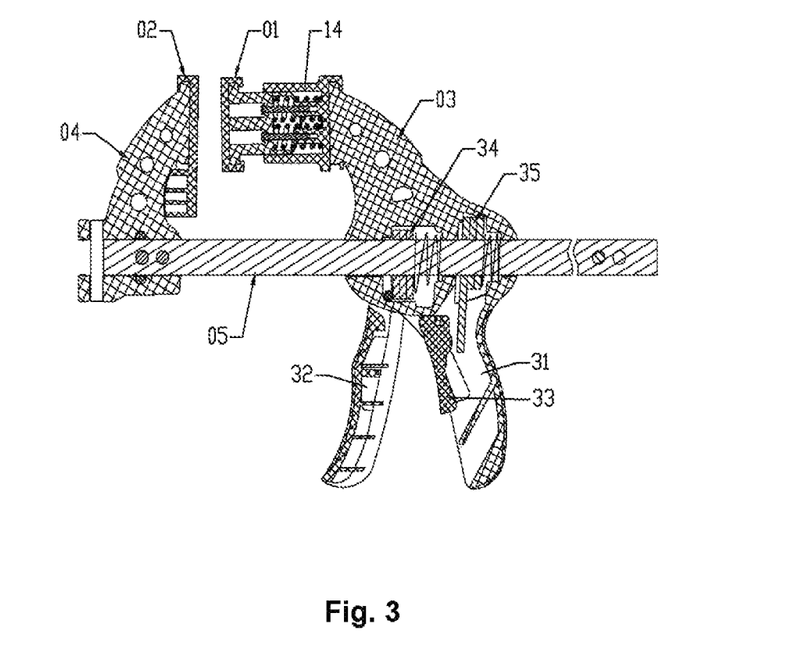
FIG. 3 is a sectional view of A-A in FIG. 2.

The structure form of a type of clamp is as shown in FIGS. 1-3, which is an F clamp. A first clamping body 01 is provided on a first arm 03, a second clamping body 02 is provided on a second arm 04, and the first arm 03 is provided with a fixed handle 31 in an integrated extending manner, the second arm 04 is fixed on a guide rod 05, and the guide rod 05 is provided on the first arm 03 in a penetrating manner, the first arm 03 is provided with a force-applying handle 32, an unlocking handle 33, a force-applying clamping piece 34 for applying a force to the guide rod, and a locking clamping piece 35 for locking the guide rod on the first arm. The force-applying handle 32 is linked with the force-applying clamping piece 34, such that when the force-applying handle and the fixed handle are gripped, the guide rod 05 is caused to slide, and the second arm 04 moves close to the first arm 03; and the unlocking handle 33 is linked with the locking clamping piece 35, such that when the unlocking handle and the fixed handle are gripped, a locking of the locking clamping piece on the guide rod is released, for releasing the clamping.

Figure 6:
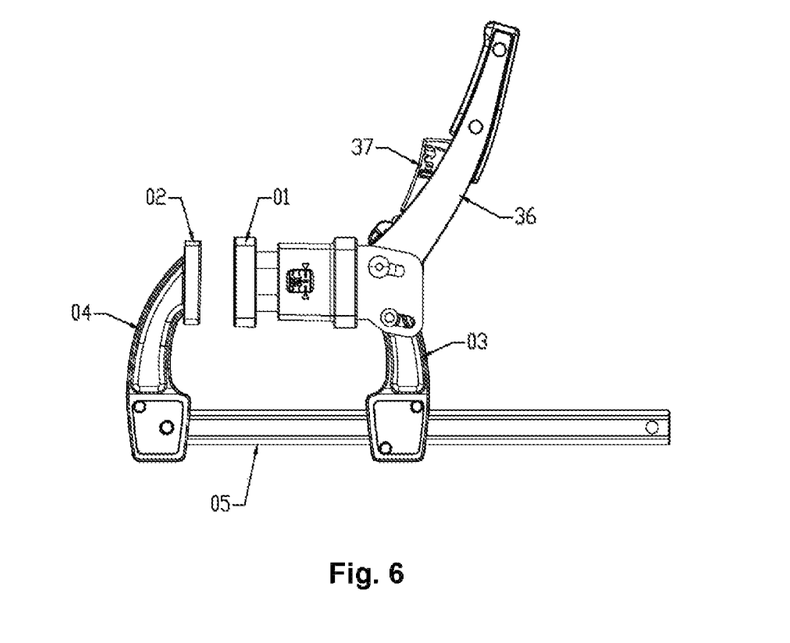
FIG. 6 is a schematic diagram of a second type of clamping force visualization clamp according to some embodiments of the present disclosure.

The structure form of another type of clamp is as shown in FIG. 6. A first clamping body 01 is provided on a first arm 03, a second clamping body 02 is provided on a second arm 04, the first arm 03 is connected with a clamping handle 36 and an unlocking handle 37, the second arm 04 is fixed on a guide rod 05, and the guide rod 05 is provided on the first arm 03 in a penetrating manner; clamping can be achieved by operating the clamping handle 36, and unlocking of the clamping can be achieved by operating the unlocking handle 37, for releasing the clamping.

Figure 7:
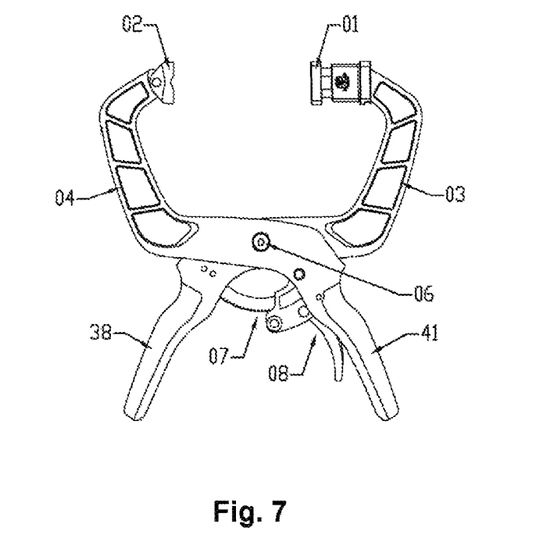
FIG. 7 is a schematic diagram of a third type of clamping force visualization clamp according to some embodiments of the present disclosure.

The structure form of a third type of clamp is as shown in FIG. 7. A first clamping body 01 is provided on a first arm 03, a second clamping body 02 is provided on a second arm 04, a first handle 38 is extended from the first arm 03, and a second handle 41 is extended from the second arm 04, the first arm 03 and the second arm 04 are connected by a pivot 06, a locking mechanism 07 and an unlocking mechanism 08 are provided between the first handle 38 and the second handle 41, the locking mechanism is a ratchet-pawl mechanism, and the unlocking mechanism includes a handle. By gripping the first handle 38 and the second handle 41, clamping is achieved and locking is achieved by the locking mechanism; and unlocking is achieved by operating the unlocking mechanism, for releasing the clamping.

Regardless which structure form the clamp takes, the base 14 and the first arm 03 can be made integrally together as shown in FIG. 8. Or, the base 14 is assembled on the first arm 03, such that the base, the first clamping body and the elastic elements form an integral structure as shown in FIG. 4 and FIG. 5 and being independent of other structures of the clamp. This independent structure has a relatively small volume, and facilitates circulation between stations when calibrating and adjusting the initial pressure of the elastic element.

The base 14 shown in FIGS. 1-3, 6 and 7 is mounted on the first arm 03 in a snap-fit manner, specifically, the base 14 is provided with a clamping groove 19 as a connecting structure, one side (the lower side as shown in the figures) of the clamping groove is open, and the remaining sides are enclosed, and the base can be conveniently snap-fitted at the mounting position of the base by the opening. Correspondingly, one end of the first arm which fits the clamping groove is provided with a head fitting with the clamping groove, and a snap-fitting with a certain pre-tightening force is realized by using the elasticity of the material (such as engineering plastics), avoiding separation. Such an assembly manner particularly facilities assembly.

Figure 9:
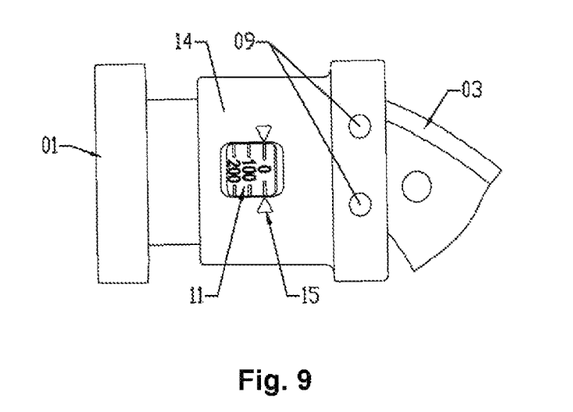
FIG. 9 is a schematic diagram in which the base is assembled on the first arm by a lateral pin bolt according to some embodiments of the present disclosure.

The base 14 shown in FIG. 9 is assembled at an end of the first arm 03 by a lateral (a direction perpendicular to the paper surface as shown in the figure) pin bolt, in which case the base is preferably sleeved with the first arm and the pin bolt is provided at the overlapping section between the base and the first arm in a penetrating manner.

Figure 10:
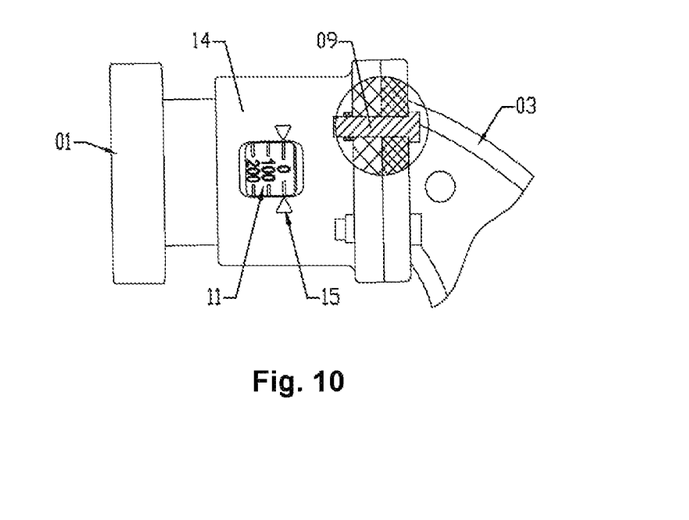
FIG. 10 is a schematic diagram in which the base is assembled on the first arm by a transverse pin bolt according to some embodiments of the present disclosure.

The base 14 shown in FIG. 10 is assembled at an end of the first arm 03 by a transverse (left-right direction as shown in the figure) pin bolt, in which case, a flange for the pin bolt to penetrate through can be provided on the base and the first arm.

In the drawings, the first clamping body and the second clamping body are determined by reference signs, but practical implementation is not limited to such representation forms, and the positions of the first clamping body and the second clamping body may be exchanged, which can also embody the concept of some embodiments of the present disclosure.

What is claimed is:

1. A clamping force visualization device, comprising:
   a first clamping body (01) for clamping an object, wherein the first clamping body (01) being telescopically assembled on a base (14);
   an elastic element (110) being provided between the first clamping body (01) and the base (14); and
   a clamping force scale (11) and a reading indicator (15) being respectively provided on the first clamping body (01) and the base (14); and when the first clamping body (01) clamps the object, the elastic element (110) measures a clamping force, and the reading indicator (15) points to the clamping force scale (11) for reading;
   an adjustment structure is provided for the first clamping body, and the adjustment structure is able to adjust an initial pressure of the first clamping body on the elastic element.

2. The clamping force visualization device as claimed in claim 1, wherein the base (14) and the first clamping body (01) are sleeved together, the base (14) or the first clamping body located at an outer side is provided with the reading indicator or the clamping force scale, and the first clamping body or the base located at an inner side is provided with the visible clamping force scale or the reading indicator.

3. The clamping force visualization device as claimed in claim 2, wherein the base (14) is provided with an axial hole (17), the first clamping body (01) is provided with a telescopic section (12), and the axial hole (17) is sleeved on the telescopic section (12).

4. The clamping force visualization device as claimed in claim 3, wherein the telescopic section (12) is provided with an inner hole (13), and one end of the elastic element (110) is supported at a bottom of the axial hole (17), and another end of the elastic element (110) is supported at a bottom of the inner hole (13).

5. The clamping force visualization device as claimed in claim 4, wherein the base (14) or the first clamping body is provided with a column (18), and the elastic element (110) is a helical compression spring sleeved on the column (18).

6. The clamping force visualization device as claimed in claim 2, wherein a window (16) is provided on the base (14) or the first clamping body located at an outer side, and the reading indicator or the clamping force scale is provided at an edge of the window.

7. The clamping force visualization device as claimed in claim 2, wherein a front end edge of the base (14) or the first clamping body located at the outer side is used as the reading indicator, and the clamping force scale is provided on the first clamping body or the base located at the inner side.

8. The clamping force visualization device as claimed in claim 1, wherein the adjustment structure is an adjustment screw (111), the adjustment screw (111) passes through the first clamping body (01) and is connected to the base (14), and the adjustment screw is screwed to adjust the initial pressure of the first clamping body on the elastic element.

9. A clamping force visualization clamp, comprising the clamping force visualization device as claimed in claim 1 and a second clamping body (02) cooperating with the first clamping body (01) to achieve clamping.

10. The clamping force visualization clamp as claimed in claim 9, wherein the base (14) is provided on a first arm (03), the second clamping body (02) is provided on a second arm (04), the first arm (03) is provided with a fixed handle (31) in an integrated extending manner, the second arm (04) is fixed on a guide rod (05), the guide rod (05) is provided on the first arm (03) in a penetrating manner, the first arm (03) is provided with a force-applying handle (32), an unlocking handle (33), a force-applying clamping piece (34) for applying a force to the guide rod, and a locking clamping piece (35) for locking the guide rod on the first arm; the force-applying handle (32) is linked with the force-applying clamping piece (34), such that when the force-applying handle (32) and the fixed handle (31) are gripped, the guide rod (OS) is caused to slide, and the second arm (04) moves close to the first arm (03), and the unlocking handle (33) is linked with the locking clamping piece (35), such that when the unlocking handle (33) and the fixed handle (31) are gripped, a locking of the locking clamping piece (35) on the guide rod is released.

11. The clamping force visualization clamp as claimed in claim 9, wherein the base (14) is provided on a first arm (03), the second clamping body (02) is provided on a second arm (04), the first arm (03) is connected with a clamping handle (36) and an unlocking handle (37), the second arm (04) is fixed on a guide rod (05), and the guide rod (05) is provided on the first arm (03) in a penetrating manner.

12. The clamping force visualization clamp as claimed in claim 9, wherein the base (14) is provided on a first arm (03), the second clamping body (02) is provided on a second arm (04), a first handle (38) is extended from the first arm (03), a second handle (41) is extended from the second arm (04), the first arm and the second arm are connected by a pivot (06), and a locking mechanism (07) and an unlocking mechanism (08) are provided between the first handle and the second handle.

13. The clamping force visualization clamp as claimed in claim 10, wherein the base (14) and the first arm are made integrally together.

14. The clamping force visualization clamp as claimed in claim 10, wherein the base (14) is assembled on the first arm (03).

15. The clamping force visualization clamp as claimed in claim 14, rein the base (14) is mounted on the first arm (03) in a snap-fit manner.

16. The clamping force visualization clamp as claimed in claim 14, wherein the base (14) is assembled on the first arm (03) by a pin bolt.

17. The clamping force visualization clamp as claimed in claim 9, wherein the base (14) and the first clamping body (01) are sleeved together, the base (14) or the first clamping body located at an outer side is provided with the reading indicator or the clamping force scale, and the first clamping body or the base located at an inner side is provided with the visible clamping force scale or the reading indicator.

18. The clamping force visualization clamp as claimed in claim 17, wherein the base (14) is provided with an axial hole (17), the first clamping body (01) is provided with a telescopic section (12), and the axial hole (17) is sleeved on the telescopic section (12).

19. The clamping force visualization clamp as claimed in claim 18, wherein the telescopic section (12) is provided with an inner hole (13), and one end of the elastic element (110) is supported at a bottom of the axial hole (17), and the other end of the elastic element (110) is supported at a bottom of the inner hole (13).

20. The clamping force visualization clamp as claimed in claim 19, wherein the base (14) or the first clamping body is provided with a column (18), and the elastic element (110) is a helical compression spring sleeved on the column (18).

* * * * *